United States Patent
Vu

(10) Patent No.: US 10,006,556 B2
(45) Date of Patent: Jun. 26, 2018

(54) VALVE STROKE AMPLIFICATION MECHANISM ASSEMBLY

(71) Applicant: VistadelTek, LLC, Yorba Linda, CA (US)

(72) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 194 days.

(21) Appl. No.: 14/932,086

(22) Filed: Nov. 4, 2015

(65) Prior Publication Data

US 2016/0138730 A1 May 19, 2016

Related U.S. Application Data

(60) Provisional application No. 62/081,740, filed on Nov. 19, 2014.

(51) Int. Cl.
*F16K 1/16* (2006.01)
*F16K 31/00* (2006.01)

(52) U.S. Cl.
CPC .............. *F16K 31/007* (2013.01); *F16K 1/16* (2013.01)

(58) Field of Classification Search
CPC . F16K 1/18; F16K 1/24; F16K 31/007; F16K 31/0682; F16K 1/16; F16K 1/22; F16K 1/221; F16K 1/222; F16K 1/226; F16K 1/2265
USPC ................... 251/58, 129.06, 129.2, 231, 236
See application file for complete search history.

(56) References Cited

U.S. PATENT DOCUMENTS

| | | | | |
|---|---|---|---|---|
| 2,638,109 A | * | 5/1953 | Wahlmark | F16K 17/10 137/115.14 |
| 3,613,518 A | * | 10/1971 | Prosser | F15B 15/10 74/18.1 |
| 4,074,701 A | * | 2/1978 | Kemmler | F15B 13/0405 137/625.27 |
| 4,301,992 A | | 11/1981 | Karbo | |
| 4,390,130 A | * | 6/1983 | Linssen | F02M 51/065 239/585.3 |
| 4,509,715 A | * | 4/1985 | Kubach | F02M 69/26 123/454 |
| 4,569,504 A | | 2/1986 | Doyle | |
| 4,648,368 A | * | 3/1987 | Gmelin | F02M 69/26 123/452 |
| 4,695,034 A | | 9/1987 | Shimizu et al. | |

(Continued)

OTHER PUBLICATIONS

International Search Report for PCT/US2015/058954 dated Feb. 1, 2016.

(Continued)

*Primary Examiner* — Michael R Reid
*Assistant Examiner* — Jonathan Waddy
(74) *Attorney, Agent, or Firm* — Lando & Anastasi, LLP

(57) ABSTRACT

A motion enhancing mechanism assembly suited for use with fluid control devices such as a piezoelectric modulating actuator of a proportional control valve. Range-limited axial motion of the actuator is transmitted through an amplifier disc to cause tilting of a control plate initially in sealing registration with an orifice ridge surrounding a fluid conduit aperture. Tilting of the control plate opens a wedge-like gap through which fluid may flow with larger conductance than is available with a planar gap of uniform height otherwise achievable with the range-limited motion of the actuator.

20 Claims, 9 Drawing Sheets

(56) References Cited

U.S. PATENT DOCUMENTS

| | | | |
|---|---|---|---|
| 4,705,059 A * | 11/1987 | Lecerf | F15B 13/0438 |
| | | | 137/625.61 |
| 4,856,555 A | 8/1989 | Gausman et al. | |
| 4,964,423 A | 10/1990 | Gausman et al. | |
| 5,040,567 A * | 8/1991 | Nestler | F16K 11/04 |
| | | | 137/625.44 |
| 5,279,328 A | 1/1994 | Linder et al. | |
| 5,660,207 A | 8/1997 | Mudd | |
| 5,799,696 A * | 9/1998 | Weiss | F16K 11/052 |
| | | | 137/625.44 |
| 6,161,783 A * | 12/2000 | Press | F02M 51/0639 |
| | | | 239/585.3 |
| 6,178,996 B1 | 1/2001 | Suzuki | |
| 6,394,136 B1 * | 5/2002 | Rohrbeck | F16K 11/052 |
| | | | 137/625.44 |
| 6,406,605 B1 * | 6/2002 | Moles | F15C 5/00 |
| | | | 137/833 |
| 6,962,164 B2 | 11/2005 | Lull et al. | |
| 8,511,337 B2 * | 8/2013 | Nishimura | F16K 1/42 |
| | | | 137/487.5 |
| 9,115,820 B2 * | 8/2015 | Scheibe | F16K 11/0525 |
| 2005/0012060 A1 * | 1/2005 | Dzialakiewicz | F16K 31/0682 |
| | | | 251/129.01 |
| 2005/0229969 A1 * | 10/2005 | Nguyen | F16K 31/0655 |
| | | | 137/240 |
| 2006/0169941 A1 | 8/2006 | Glime | |
| 2006/0191777 A1 | 8/2006 | Glime | |
| 2013/0009086 A1 | 1/2013 | Walker | |
| 2015/0267838 A1 * | 9/2015 | Gassman | F16K 31/42 |
| | | | 251/30.01 |

OTHER PUBLICATIONS

McDonald, "Radial Viscous Flow between Two Parallel Annular Plates" Joseph Henry Laboratories, Princeton University (Jun. 25, 2000).

* cited by examiner

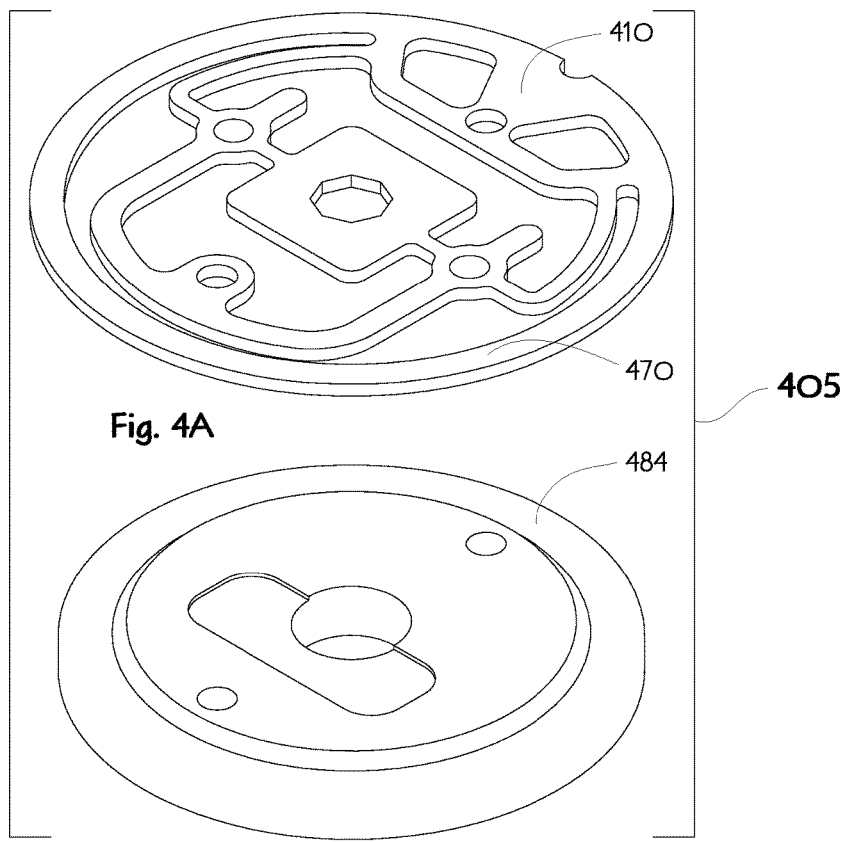
Fig. 4A
Fig. 4B
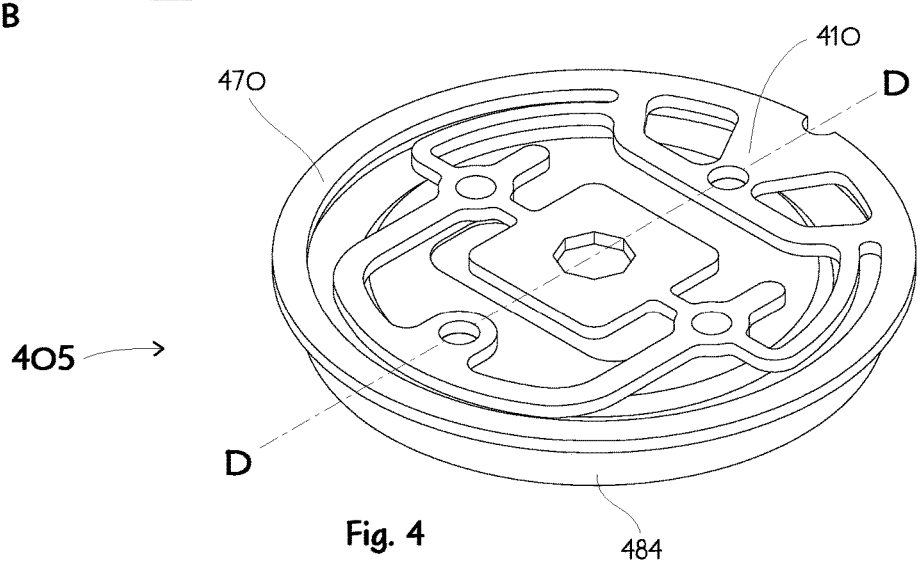
Fig. 4

VALVE STROKE AMPLIFICATION MECHANISM ASSEMBLY

CROSS-REFERENCE TO RELATED APPLICATIONS

This application claims the benefit under 35 U.S.C. § 119(e) and PCT Article 8 to U.S. Provisional Application Ser. No. 62/081,740 titled "VALVE STROKE AMPLIFICATION MECHANISM," filed Nov. 19, 2014, which is hereby incorporated by reference in its entirety for all purposes.

This application includes information previously disclosed by the present inventor in U.S. patent application Ser. No. 14/737,564 filed Jun. 12, 2015, titled "HIGH CONDUCTANCE VALVE FOR FLUIDS AND VAPORS," and in U.S. patent application Ser. No. 14/477,573 filed Sep. 4, 2014, titled "INTERLACE LIFTING MECHANISM," each of which is incorporated herein by reference, in their entirety.

BACKGROUND OF THE INVENTION

The present invention is related to a motion enhancing mechanism that is well suited for use with flow control devices like the modulating actuator of a proportional control valve. The invention is particularly useful in valves intended for proportional, or modulating, control of fluid delivery within industrial processes making semiconductor devices, pharmaceuticals, or fine chemicals, and many similar fluid delivery systems.

The field of control valves intended for use within automated process control systems is broad and well known. Many proportional control valves have one or more moveable elements that may be actively positioned, anywhere between an extreme open condition and an extreme closed condition, to adjust the flow of fluid passing therethrough. Fluid delivery apparatus intended for manipulating process materials within semiconductor manufacturing equipment usually require attention to maintaining high purity of the delivered reactants and also are typically much smaller than valves used in petrochemical plants, for example.

Many different types of powered valve actuators are found in high purity instrumentation and control apparatus such as mass flow controllers. U.S. Pat. No. 4,695,034 issued to Shimizu et al. describes use of a stack of piezoelectric disc elements to effect movement of valve parts in a mass flow controller. U.S. Pat. No. 4,569,504 issued to Doyle describes use of a magnetic solenoid with interleaved magnetic circuit elements. U.S. Pat. No. 5,660,207 issued to Mudd describes use of a heated resistance wire that changes length with temperature to effect valve element movement. U.S. Pat. No. 6,178,996 issued to Suzuki describes use of a pressurized fluid, such as nitrogen gas, to control the degree of opening of a bellows-operated diaphragm-sealed control valve.

The patents mentioned above also illustrate a variety of moveable and fixed fluid pathway element combinations found in mass flow controller valves. Shimizu shows six different valve constructions wherein an approximately conical element translates toward or away from a circular opening having its axis aligned with the axis of said cone. Doyle shows a disk-shaped element, having a flat surface (colloquially called the seat) perpendicular to the valve axis of symmetry, which translates toward or away from an orifice surrounded by a narrow lip (together colloquially called the jet). Mudd shows a spherical gate-member which translates toward or away from a dished circular seat. Suzuki shows a combination of shapes which translate axially to change the conductance through fluid channels of the valve. Fluid dynamic characteristics of the variable geometry fluid pathway, formed by the combination of fixed and moveable valve elements, tend to dominate the relationship between actuator position and valve conductance.

SUMMARY OF THE INVENTION

In consideration of the foregoing, applicant has worked with the jet & seat class of fluid pathway element combinations and devised a mechanism to provide superior regulation of fluid flow. A motion enhancing mechanism suited for use with devices like a piezoelectric modulating actuator of a proportional control valve is disclosed. Range-limited axial motion of the actuator is transmitted through an amplifier disc to cause tilting of a control plate initially in sealing registration with an orifice ridge surrounding a fluid conduit aperture. Tilting of the control plate opens a wedge-like gap through which fluid may flow with larger conductance than is available with a simple gap of uniform height.

In a typical embodiment of the valve stroke amplification mechanism, also referred to herein as a valve stroke amplification mechanism assembly, the control plate tilts with respect to an off-center circular orifice ridge in a valve body. In another embodiment of the valve stroke amplification mechanism assembly, the control plate tilts with respect to a closed, non-circular shaped orifice ridge, such as a kidney-shaped orifice ridge, and the greater motion of the control plate occurs proximate to the largest radius (i.e., the arc with the largest planar length) of the kidney shape while the least motion of the control plate occurs proximate to the kidney shape small ends (those arcs with a smaller planar length).

At least one embodiment of the disclosure is directed to a method of increasing available conductance of a proportional control valve having a control plate and an orifice ridge, wherein the control plate is controllably tilted with respect to the orifice ridge to open a wedge-like gap allowing fluid flow therethrough.

In one example, the controllable tilting of the control plate is responsive to uniaxial actuator motion, wherein a thickest portion of the wedge-like gap is at least twice as large as a dimension that would be achieved with the same uniaxial actuator motion forming a gap of uniform thickness. In another example, the controllable tilting is caused by a mechanism entirely contained within a fluid flow path of the proportional control valve.

According to another embodiment, a valve stroke amplification mechanism apparatus comprises an elastically springy amplifier disc centrally coupled to an actuated valve element, and a control plate with planar surface configured to contact an orifice ridge surrounding a fluid conduit aperture, wherein the amplifier disc causes the control plate to tilt with respect to a plane of the orifice ridge.

In one example, the valve stroke amplification mechanism is disposed within a valve chamber, wherein the control plate is flexibly attached to the actuated valve element by the amplifier disc and the control plate is distinct from sealing elements of the valve chamber. According to another example, the control plate is only parallel to the orifice ridge when the actuated valve element is in a closed flow blocking condition. According to one example, the valve stroke amplification mechanism is disposed in a valve body, the orifice ridge surrounding the fluid conduit aperture is circular and not centered in the valve body, and the control plate tilts with respect to the orifice ridge. According to another example, the orifice ridge surrounding the fluid conduit aperture has a kidney shape with small ends, wherein the control plate tilts with respect to the kidney-shaped orifice ridge, and wherein a greater amount of motion of the control plate occurs proximate to a largest radius of the kidney shaped orifice ridge while a least amount of motion of the control plate occurs proximate to the small ends of the kidney shaped orifice ridge.

In one example, the amplifier disc and the control plate are each comprised of unitary metallic materials. In one example, the unitary metallic materials are chosen from among 300 series stainless steel alloys, a chromium alloy, or a nickel alloy. According to another example, the amplifier disc and the control plate are each comprised of unitary polymer materials. In one example, the unitary polymer materials are chosen from among polypropylene (PP), polyvinylidene fluoride (PVDF), perfluoroalkoxy polymer (PFA), polytetrafluoroethylene (PTFE), polychlorotrifluoroethylene (PCTFE), or polyimide (Vespel®).

In accordance with one aspect of the present invention, a valve stroke amplification mechanism assembly is provided. The valve stroke amplification assembly comprises an amplifier disc having an inner segment and an outer periphery, the inner segment mechanically coupled to and spaced apart from the outer periphery by connecting arms such that axial displacement of the inner segment causes asymmetric displacement of opposing portions of the outer periphery of the amplification disc, and a control plate mechanically coupled to the amplifier disc.

In some embodiments, the amplifier disc is configured to flex and is coupled to an actuated valve element, and the control plate has a planar surface configured to contact an orifice ridge surrounding a fluid conduit aperture such that the asymmetric displacement causes the planar surface of the control plate to tilt at an angle with respect to a plane of the orifice ridge. According to a further embodiment, the amplifier disc and the control plate are disposed within a valve chamber, and the control plate is attached to a deflectable portion of the actuated valve element by the amplifier disc and is distinct from one or more sealing elements of the valve chamber. According to another embodiment, the control plate is configured to block fluid flow through the valve chamber when the planar surface is positioned parallel to the plane of the orifice ridge.

According to another embodiment, the amplifier disc and the control plate are disposed within a top-works attached to a valve body comprising the orifice ridge and the fluid conduit aperture. According to one embodiment, the orifice ridge is circular and off-center within the valve body. According to another embodiment, the orifice ridge is non-circular. According to a further embodiment, the orifice ridge has a kidney shape having four interconnected curved segments that form a non-circular closed circuit surrounding the fluid conduit aperture such that three of the curved segments curve toward the fluid conduit aperture and one curved segment curves away from the fluid conduit aperture and a first of the three curved segments that curve toward the fluid conduit aperture has a larger radius than a second and a third curved segment, the orifice ridge and control plate configured such that when the control plate is tilted at an angle a gap formed between the control plate and the first of the three curved segments is greater than a gap formed between the control plate and the second and the third of the three curved segments.

According to certain embodiments, at least one of the amplifier disc and the control plate comprise metallic materials. According to a further embodiment, the metallic materials are at least one of 300 series stainless steel alloys, chromium alloys, and nickel alloys.

According to other embodiments, the at least one of the amplifier disc and the control plate comprise polymer materials. According to a further embodiment, the polymer materials are at least one of polypropylene, polyvinylidene fluoride, perfluoroalkoxy polymer, polytetrafluoroethylene, polychlorotrifluoroethylene, and polyimide.

According to some embodiments, the connecting arms include a pair of passive connecting arms and a pair of swivel connecting arms, each pair of the passive connecting arms and the swivel connecting arms positioned in a bilaterally symmetrical physical arrangement. According to a further embodiment, the pair of swivel connecting arms are connected by a swivel lever bar and the pair of passive connecting arms are connected by a passive segment.

According to another embodiment, the amplifier disc further comprises a plurality of functional elements positioned in a bilaterally symmetrical physical arrangement. According to a further embodiment, the plurality of functional elements includes at least one of attachment points, balance tabs, tooling holes, and torsion bars. According to another embodiment, the control plate is mechanically coupled to the amplifier disc at the attachment points.

In accordance with another aspect of the invention, a method of increasing available conductance of a proportional control valve having a control plate and an orifice ridge is provided. The method comprises controllably tilting the control plate with respect to the orifice ridge to open a wedge-like gap between the control plate and the orifice ridge to allow fluid flow therethrough.

According to one embodiment, tilting is caused by a mechanism contained entirely within a fluid flow path of the proportional control valve. According to a further embodiment, tilting is caused by uniaxial actuator motion, and wherein a thickest portion of the wedge-like gap is at least twice as large as a thickness of a planar uniform gap that would be achieved with the same uniaxial actuator motion used in combination with a proportional control vale without the mechanism.

The present invention will be more fully understood after a review of the following figures, detailed description and claims.

BRIEF DESCRIPTION OF DRAWINGS

The accompanying drawings are not intended to be drawn to scale. For purposes of clarity, not every component may be labeled in every drawing. In the drawings:

FIG. 4 illustrates a perspective view of a representative Valve Stroke Amplification Mechanism (VSAM) assembly that includes an amplifier disc and a control plate;

FIG. 4A illustrates a perspective view of the amplifier disc of FIG. 4;

FIG. 4B illustrates a perspective view of the control plate of FIG. 4;

DETAILED DESCRIPTION

Figure 1A:
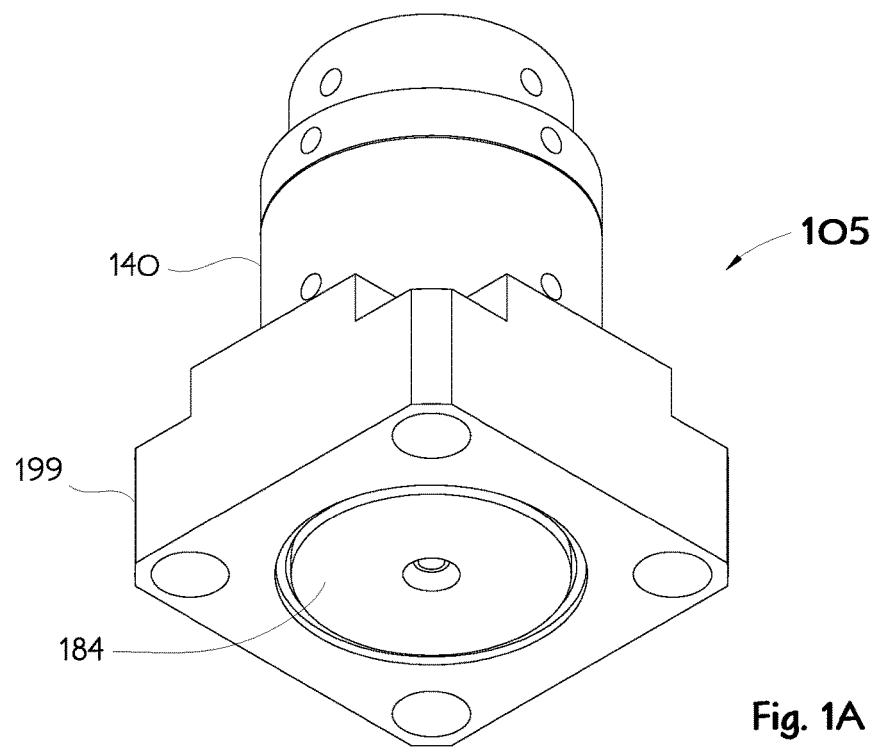
FIG. 1A illustrates a perspective view of one example of a top-works that attaches to a metal valve body (FIG. 1B) and is lifted off to reveal control plate details.

The examples of the apparatus and methods discussed herein are not limited in application to the details of construction and the arrangement of components set forth in the following description or illustrated in the drawings. The apparatus and methods are capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The following description may use notional directions (up and down, above and below, left and right, front and back, etc.) to assist understanding of relationships among the mechanism pieces, and in general, the illustrative Figures will match the notional directions, but it should be appreciated that an apparatus using the invention may take on any configuration in space.

The apparatus and methods discussed herein are broadly directed to fluid control valves and may be applied to the general field of mass flow controllers, such as those used for semiconductor manufacturing, where a jet & seat combination of fluid pathway elements is used. The jet element is typically a circular orifice surrounded by an adjacent orifice ridge of determined lateral extent, in a nominally radial direction, defining a plane generally perpendicular to the axis of the orifice. The seat is a generally flat planar element situated over the orifice ridge and extending sufficiently in the lateral direction to cover the entire periphery of the orifice ridge. The seat plane is parallel to the orifice ridge plane and the seat is moved by the valve actuator in a direction perpendicular to those planes, and the motion is typically parallel to the orifice axis. In the majority of this disclosure the seat is referred to as a control plate.

When such a jet & seat valve is initially opened, there is a very small gap between the seat and the orifice ridge whereby fluid flow will commence squeezing radially through the planar annular gap. Applicant has empirically observed this early initial flow has a nonlinear relationship with actuator position. When fluid pressures are relatively low (e.g. one or two atmospheres) this nonlinearity can be mistaken for being a conductance threshold, because novice device users may not have sufficiently sensitive measurement capability in their testing arrangements. There is no threshold as such, no extended region of actuator positions actually yielding zero flow, but the flow is so low it will be undetected until a suitably large gap is created by sufficient actuator movement.

In the case where there are very small valve openings and low flow rates, the circumstances correspond to a situation often called "creeping flow," where the Reynolds numbers are low and the viscous forces have much more effect than the inertial forces in the fluid. The observed behavior may be understood (as further explained below) from considering a related theoretical analysis by Kirk T. McDonald at the Joseph Henry Laboratories, Princeton University, Princeton N.J. 08544, in his 25 Jun. 2000 paper titled "Radial Viscous Flow Between Two Parallel Annular Plates." In the case of a nominally circular orifice, surrounded by an orifice ridge of nominally constant width, the gap between the orifice ridge (jet) and an adjacent planar control plate (seat) may create conditions analogous to those in the aforementioned analysis "Radial Viscous Flow Between Two Parallel Annular Plates." According to this analysis, flow moving from the inner orifice radially outward will have a velocity that decreases inversely with increasing radius (from the orifice central axis) while showing a parabolic variation across the gap height. Further, an average flow velocity as a function of radius may be ascribed to the parabolic variation, thereby making the effective volumetric flow at any radius appreciated as follows:

$$V\text{ave}\{r\}=(1/r)*(h^2*(P1-P2))/(12*eta*\ln\{r2/r1\}) \quad \text{Equation (1)};$$

wherein consistent units are used for the factors and
Vave{ } (velocity=[meters/second]),
r=radius [meters] at which the average velocity Vave is found,
h=gap height [meters],
P1=pressure [kilogram/meter^2] at orifice ridge inner radius (r1) [meters],
P2=pressure [kilogram/meter^2] at orifice ridge outer radius (r2) [meters],
eta=viscosity of the fluid [kilogram/(meter*second)]= [Pascal*second], and
ln {n}=Natural Logarithm of "n"=Napierian Logarithm of "n" to the base "e."
Specific simplifying assumptions which need to be confirmed when checking the validity of any particular calculation according to Equation (1) include:

Vave<Mach 0.3 to minimize compressibility issues (i.e. fluid is assumed incompressible);

$$(rho*h^4*(P1-P2))/(144*eta^2*r1^2*\ln\{r2/r1\})<<1;$$

the nonlinear kinetic energy term mass*V^2 is small; and rho=density of the fluid.

Evaluating Vave{r} at the inner radius of the orifice ridge (which is the outer edge of the orifice itself) yields an average fluid velocity Vave{r1} [meters/second] entering the gap between the seat and the orifice ridge. This fluid velocity is passing through a throat area which is a circumferential band of height "h" [meters]:

$$A\_throat\{r1\}=2*pi*r1*h[meters^2] \qquad \text{Equation (2)}.$$

With fluid density "rho" [kg/m^3], the mass passing through the "r1" circumferential gap according to this viscous flow model is simply:

$$Qv\{r1,h\}=Vave\{r1\}*A\_throat\{r1\}*rho; \text{ or alternatively}$$

$$Qv\{r1,h\}=((1/r1)*(1/^2*(P1-P2))/(12*eta*\ln\{r2/r1\}))*(2*pi*r1*h)*rho; \text{ or alternatively}$$

$$Qv\{r1,h\}=(rho*2*pi*h^3*(P1-P2))/(12*eta*\ln\{r2/r1\})[kg/sec] \qquad \text{Equation (3)}.$$

The mass flow Qv{r1,h} through very small openings of jet & seat type valves may thus be seen as a highly nonlinear cubic function of the opening gap "h." When the incompressibility constraint is maintained (Vave<Mach 0.3), the density "rho" remains constant across the radial extent of the two annular plates and the mass entering at the inner "r1" circumferential gap is equal to the mass exiting at the outer "r2" circumferential gap:

$$Qv\{r1,h\}=Qv\{r2,h\}=Qv\{h\}[kg/sec] \qquad \text{Equation (4)}.$$

In the context of manufacturing semiconductors, mass flow is usually described in terms of volumetric flow at standard conditions of temperature and pressure (STP). The preferred defining reference is SEMI® Standard E12-0303 wherein standard temperature is defined as 273.15 Kelvin=0.0 deg Centigrade, standard pressure is 101,325 Pascals (1_atmosphere=760 torr), and the standard density of a perfect gas under such conditions corresponds to a volume of 22,413.6 cubic centimeters per mole, meaning:

(molecular weight[grams/mole])/(std·molar·vol 22,413.6 [scc/mole])=density[grams/cc]$STP$.

Flow rates are thereby expressed as standard cubic centimeters per minute ("sccm"), and are most useful as an alternative to mole fraction, which can be directly compared when deducing the stoichiometry of reactants delivered to semiconductor manufacturing process chambers. The mass flow Qv{h} Equation (4) may be expressed in sccm as:

$$Qvstp\{h\}=Qv\{h\}*(1000/mol\cdot wt)*(22413.6)*(60) [sccm] \qquad \text{Equation (5)},$$

where the molecular weight "mol·wt" is usually expressed as grams per mole, while the mass flow expression of Equation (3) and Equation (4) is given in kilograms per second and necessitates the two conversions of units [1000 grams/kilogram] & [60 seconds/minute].

Moderate valve openings that enable fluid to exit the circumferential gap, at radius "r2," with velocity Vave{r2} sufficient to require consideration of the kinetic energy may be modeled in a manner similar to the explanation found in U.S. Pat. No. 6,962,164 issued to Lull, Wang, Valentine and Saggio. For any particular gas species at absolute temperature "T" (nominally the same as the apparatus temperature), a valve orifice ridge of inner radius "r1" and outer radius "r2," and chosen upstream and downstream pressures, the process is as follows. An unknown pressure "Px" is hypothesized between upstream pressure "P1" (stagnation pressure before orifice ridge inner radius r1) and downstream pressure "P2" (stagnation pressure after orifice ridge outer radius r2). For any particular opening gap "h," the mass flow driven by the pressure difference (P1-Px) is calculated using the viscous flow model of Equation (3):

$$Q1\{h,Px\}=(rho*2*pi*h^3*(P1-Px))/(12*eta*\ln\{r2/r1\})[kg/sec] \qquad \text{Equation(6)}$$

The flow Q1{h,Px} of Equation (6) passes through a throat area that is a circumferential band of height "h" [meters] at radius "r2" [meters]:

$$A\_throat\{r2\}=2*pi*r2*h[meters^2] \qquad \text{Equation (7)}.$$

For that same particular opening gap "h," a compressible inviscid unchoked mass flow driven by the pressure difference (Px-P2) is modeled according to:

$$Q2\{h,Px\}=K*(D*A\_throat\{r2\})*Px*(P2/Px)^{((gamma+1)/(2*gamma))}*SQRT\{((2*gamma)/((gamma-1)*(mol\cdot wt*T)))*((Px/P2)^{((gamma-1)/(gamma))}-1)\} \qquad \text{Equation (8)},$$

where:
K=a constant necessary to rationalize units as chosen (e.g. meters v. inches, torr v. kg/m^2, etc.);
D=discharge coefficient of the throat area (typically about 0.7);
A_throat{r2}=throat area at radius "r2" and opening gap "h" per Equation (7);
Px=intermediate pressure wherein modeled viscous flow becomes modeled inviscid flow;
P2=downstream stagnation pressure;
gamma=ratio of specific heats for the particular gas (gamma=Cp/Cv;approximately: monatomic=1.66, diatomic=1.40,triatomic=1.27);

SQRT{ }=square root function;
mol·wt=molecular weight of the particular gas; and
T=absolute temperature of the particular gas.

From conservation of mass, the calculated two mass flows should be the same. In an iterative process they are compared by subtraction, Q1{h,Px}-Q2{h,Px}, and if the difference exceeds a predetermined threshold a new improved estimate of "Px" is made and the calculation of Equation (6) and Equation (8) is repeated. A typical criterion for agreement between the two calculated mass flow rates might be that the absolute value of ((Q1{h,Px}-Q2{h,Px})/(Q1{h,Px}+Q2{h,Px}))<0.1%. Various known iterative numerical schemes (e.g. Newton, Householder, etc.) may be used when seeking the corresponding particular value of "Px" that minimizes the difference. The mass flow calculated for the minimizing "Px" may then be taken as the mass flow which will pass through the valve with an opening gap "h," inlet pressure "P1," and outlet pressure "P2."

The accuracy of the preceding flow model (when used subject to the constraints noted at Equation (1) above) in explaining an apparent valve threshold may be appreciated by considering the empirical data shown in Table 1 below. The tested jet & seat valve had an inner radius of nominally r1=0.010 inches=0.000254 m with an orifice ridge width of about 0.012 inches=0.000305 m (meaning r2=0.00056 m). Nitrogen gas at 20 deg C. was passed from an upstream pressure P1=7 psig=1123 torr to a downstream pressure P2=1 atm=760 torr.

TABLE 1

Empirical versus Calculated Flows

| opening gap "h" [meters] | calculated Px [torr] | calculated Q1 {h, Px} [sccm] | observed flow [sccm] |
|---|---|---|---|
| 6.35E−06 | 760.036 | 2.7 | not available |
| 1.27E−05 | 760.633 | 21.4 | 22 |
| 2.54E−05 | 769.874 | 166.6 | 250 |
| 3.81E−05 | 796.911 | 519.2 | 500 |
| 5.08E−05 | 837.593 | 1076.9 | 886 |

In the event that the valve is tested with a measurement device having a full-scale capacity of 1,000 sccm, it is likely that initial flow will not be observed. With a 6.35E-06 meter valve opening corresponding to 5% of nominally maximum useful stroke (maximum useful stroke=orifice diameter/4=1.27E-04 meters), the flow would be approximately 0.27% of full-scale which is of the same magnitude as typical flow meter noise and therefore indistinguishable from a no-flow condition. With a 1.27E-05 meter valve opening corresponding to 10% of predicted maximum useful stroke, the flow would be approximately 2.1% of full-scale, causing a casual observer to conclude that the valve elements have barely moved. The preceding situation is exacerbated by the use of a piezoelectric type valve actuator in that even a skillfully used device has an overall extension ability that is typically limited to about 5.00E-05 meters (fifty microns), which corresponds to approximately two thousandths of an inch (0.002"). Using a piezoelectric actuator, the indiscernible flow at a 6.35E-06 meter opening corresponds to about 13% of available stroke and the mentioned 2.1% of full-scale flow would correspond to about 25% of available stroke.

Figure 1B:
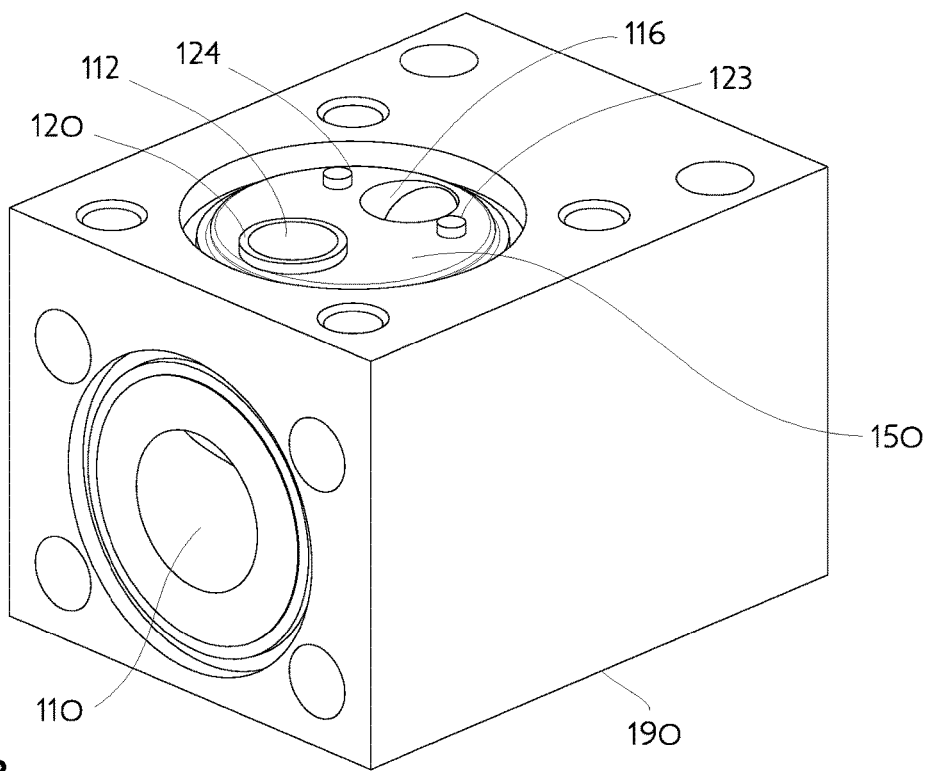
FIG. 1B illustrates a perspective view of top-works lifted off one example of a valve body that operates in combination with the top-works of FIG. 1A and reveals valve chamber details.

Referring to the Figures, FIGS. 1A and 1B provide a perspective view of one example of a metal valve body 190 (FIG. 1B) with a top-works 105 lifted off (FIG. 1A) to reveal details of a valve chamber 150 and a control plate 184. A first fluid conduit 110 (typically an inlet) connects an adjacent end of the valve body 190 with an inner fluid conduit aperture 112 providing fluid communication, across a circular orifice ridge 120, into the valve chamber 150 and onward through an outer fluid conduit aperture 116 (typically connecting to an outlet not shown). The top-works 105 includes an actuator housing 140, a top-works body 199, and a control plate 184. The control plate 184 may be controllably moved away from the circular orifice ridge 120 through action of an actuator (not visible) inside the actuator housing 140. In this example, the control plate 184 remains essentially parallel to the plane of the orifice ridge 120 while being translated generally perpendicular to the plane of the orifice ridge by an actuator which may be piezoelectric, electromagnetic, or fluid driven, as recognized by those skilled in the art. In this example valve, the circular orifice ridge corresponds to the jet and the control plate corresponds to the seat when described as a jet & seat type proportional valve. The orifice ridge 120 and outer fluid conduit aperture 116 may be offset toward opposite sides of the valve chamber 150 in an approximately symmetrical arrangement. A pair of rest pins 123,124 located adjacent the outer fluid conduit aperture 116 are coplanar with the orifice ridge 120 to provide balanced three point support of the control plate 184 when the valve is intended to fully stop fluid flow by the control plate 184 being brought into sealing contact with the orifice ridge 120.

Figure 2A:
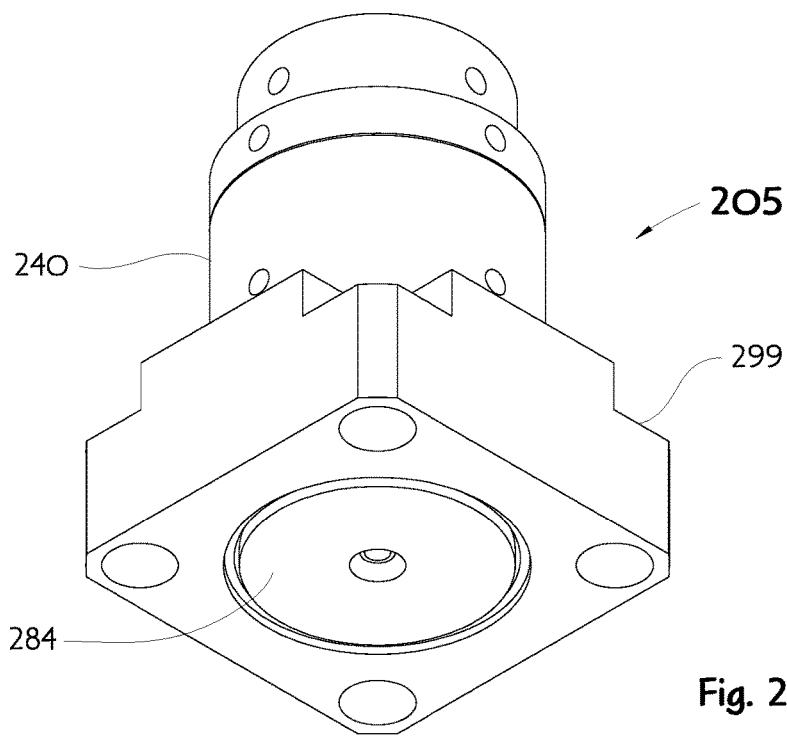
FIG. 2A illustrates a perspective view of a top-works that attaches to a high-conductance metal valve body (FIG. 2B) and is lifted off to reveal control plate details.
Figure 2B:
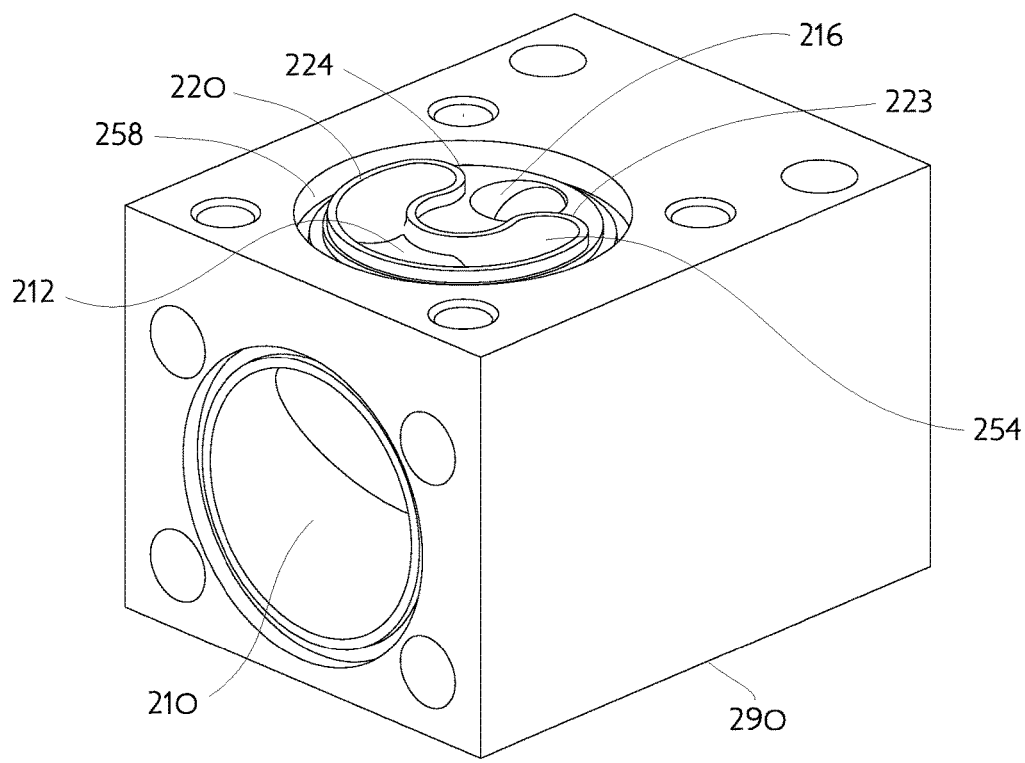
FIG. 2B illustrates a perspective view of one example of a high-conductance metal valve body that operates in combination with the top-works of FIG. 2A and reveals valve chamber details.

A perspective view of a representative embodiment of a high-conductance valve is illustrated in FIGS. 2A and 2B, and the functionality of this type of valve is described more completely in U.S. patent application Ser. No. 14/737,564 filed Jun. 12, 2015, titled "High Conductance Valve for Fluids and Vapors." The high-conductance valve includes a metal valve body 290 (FIG. 2B) with a top-works 205 (FIG. 2A) lifted off in the illustration to reveal details of a valve chamber (comprised of an inner cavity 254 and an outer cavity 258) and a control plate 284. A first fluid conduit 210 (typically an inlet) connects an adjacent end of the valve body 290 with an inner fluid conduit aperture 212 providing fluid communication, across a closed, non-circular shaped orifice ridge, such as the kidney-shaped orifice ridge 220 illustrated in FIG. 2B, into the outer cavity 258 and onward through an outer fluid conduit aperture 216 (typically connecting to an outlet not shown). The peripheral length of the kidney-shaped orifice ridge 220 is much greater than the circumference of the largest circular orifice ridge that could potentially be fit within the valve body 290, and as a consequence, a greater conductance may be achieved while using a typical top-works. The top-works 205 includes an actuator housing 240, a top-works body 299, and a control plate 284. The control plate 284 may be controllably moved away from the kidney-shaped orifice ridge 220 through action of an actuator (not visible) inside the actuator housing 240. In this inventive valve, the kidney-shaped orifice ridge corresponds to the jet and the control plate corresponds to the seat when described as a jet & seat type proportional valve. The small ends 223, 224 of the kidney shape located adjacent the outer fluid conduit aperture 216, along with the opposite large radius of the kidney shape located between the outer cavity 258 and the inner fluid conduit aperture 212, provide balanced support of the control plate 284 when the valve is intended to fully stop fluid flow by the control plate 284 being brought into sealing contact with the orifice ridge 220. The kidney-shaped orifice ridge 220 may generally be described as having four interconnected curved segments that form a non-circular closed circuit that surrounds the inner fluid conduit aperture 212 such that three of the curved segments curve toward the fluid conduit aperture and one curved segment curves away from the inner fluid conduit aperture 212. Thus, a first of the three curved segments that curve toward the fluid conduit aperture has a larger radius (e.g., the "C" of the kidney-shape that terminates in small ends 223 and 224) than a second and a third curved segment (e.g., small ends 223, 224). As explained further below, a control plate (e.g., 484, FIG. 4) is tilted at an angle, a gap formed between the control plate and the first of the three curved segments is greater than a gap formed between the control plate and the second and third of the three segments. It should be appreciated that other closed, non-circular shaped orifice ridges having shapes other than a kidney shape could alternatively be used, such as those described in U.S. patent application Ser. No. 14/737,564.

Figure 3A:
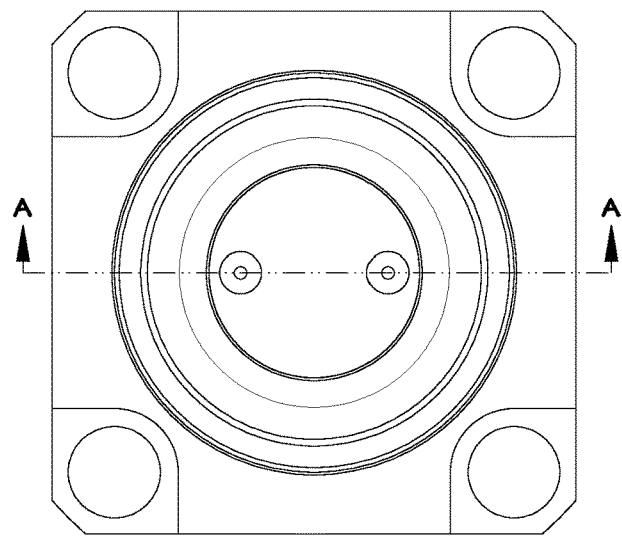
FIG. 3A illustrates a plan view of one example of a top-works.
Figure 3B:
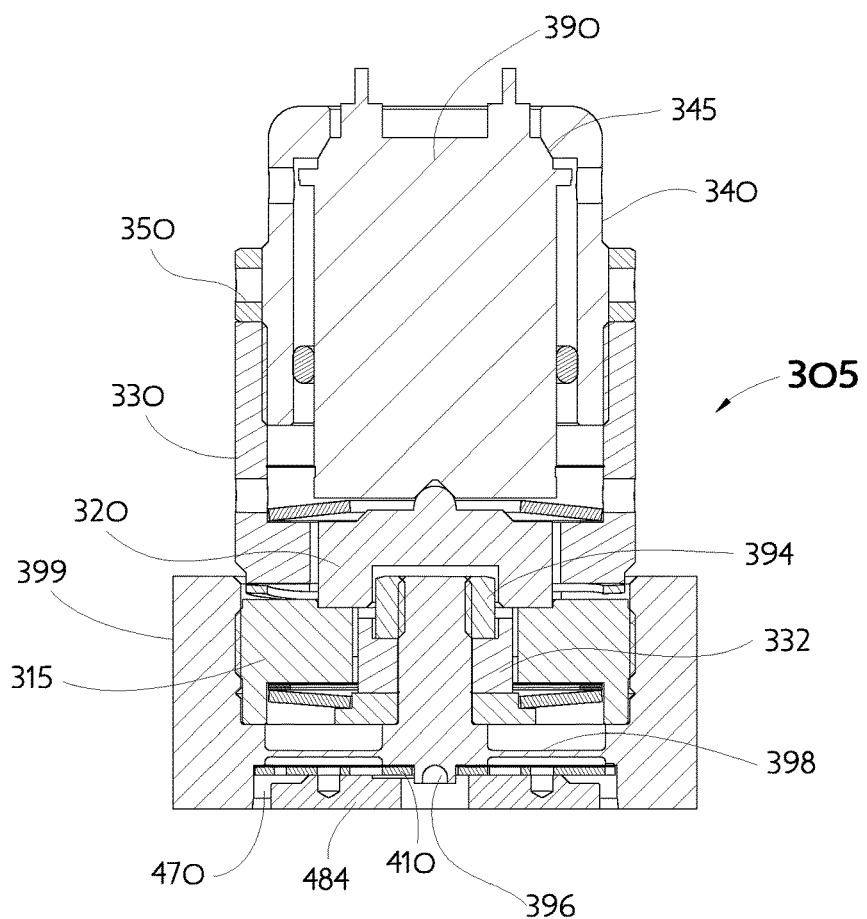
FIG. 3B illustrates a cross section view of the top-works of FIG. 3A that includes a piezoelectric actuator and a Valve Stroke Amplification Mechanism (VSAM) assembly in accordance with aspects of the invention.

A plan view and a cross section view of a top-works 305 is illustrated in FIGS. 3A and 3B, and is described more completely in U.S. patent application Ser. No. 14/477,573, filed Sep. 4, 2014 titled "Interlace Lifting Mechanism" which is commonly owned and expressly incorporated herein by reference, in its entirety. The top-works 305 is an example of a top-works with a piezoelectric actuator as may be used with the valves illustrated in FIGS. 1B and 2B, and also includes a Valve Stroke Amplification Mechanism (VSAM) assembly, as discussed in more detail below in reference to FIGS. 4, 4A-4F). According to this example, the top-works 305 includes a body 399 with an integral diaphragm 398 and central shaft 396 through which a control plate 484 (part of the VSAM assembly 405) is moved. The diaphragm 398 may be flexed to move the control plate 484 while keeping process fluids contained within a valve chamber (not shown in FIGS. 3A and 3B) and excluded from the actuator portion of the top-works. Control valves sealed by a separate diaphragm, bellows, sliding gaskets and other designs are well known. The actuator portion of the top-works 305 includes a mounting nut 315 affixed to the top-works body 399. The mounting nut 315 is pierced axially by an oblong slot into which projects a traverse bar 332 portion of a lifting housing 330 located above the mounting nut 315. The traverse bar 332 portion has a hole which accepts the central shaft 396 that is captured by a retaining nut 394. A cross over plate 320 sits upon the mounting nut 315, astride the traverse bar 332, and contacts the bottom of a piezoelectric stack actuator 390. An actuator housing 340 is screwed into the lifting housing 330 until an internal lip 345 of the actuator housing 340 contacts the upper end of the piezoelectric stack actuator 390. The engagement of the actuator housing 340 and the lifting housing 330 is held fixed by a housing lock nut 350. Application of an appropriate activation voltage will cause expansion of the piezoelectric stack actuator 390 and result in a downward force of the actuator bottom against the cross over plate 320 and the mounting nut 315. The upper end of the actuator 390 also makes an upward force against the internal lip 345 which moves both the actuator housing 340 and the lifting housing 330 upward. The traverse bar 332 portion of the lifting housing 330 consequently moves upward as well and pulls the central shaft 396, thereby deflecting the diaphragm 398. Movement of the central shaft 396 is coupled to an amplifier disc 410 (part of VSAM assembly 405) which moves the control plate 484 upward into the top-works body 399 away from a corresponding orifice ridge thereunder (not shown). The arrangement of the amplifier disc 410 whereby the control plate 484 tilts with respect to the plane of the orifice ridge (i.e., does not remain generally parallel) is discussed further below.

In the case of both the example and valve bodies 190 and 290 (FIGS. 1B and 2B) described above, the mass flow of fluid through each valve would normally be a highly non-linear cubic function of the opening gap "h" between their respective orifice ridge 120, 220 and corresponding control plate 184, 284 as shown by Equation (3). Applicant has devised a Valve Stroke Amplification Mechanism which lifts a control plate 184, 284 away from an orifice ridge 120, 220 by tilting the control plate at an angle. This mechanism and corresponding assembly increase the effective stroke of the actuator (typically a stroke-limited piezoelectric stack) and makes the resultant opening gap "h" become a wedge-like clearance that varies with position along the orifice ridge. The controllable valve conductance is increased for any actuator extension opening the valve and lessens the perceived "threshold" phenomenon. A representative example of a Valve Stroke Amplification Mechanism assembly 405 (hereinafter also referred to as a "VSAM" or "VSAM assembly") is illustrated in FIG. 4 and comprises an amplifier disc 410 and a control plate 484. The perspective view of FIG. 4 shows a representative amplifier disc 410 (FIG. 4A) separated above a representative control plate 484 (FIG. 4B) to clarify how the two items lay together forming the VSAM assembly 405 shown in FIG. 4.

Figure 4C:
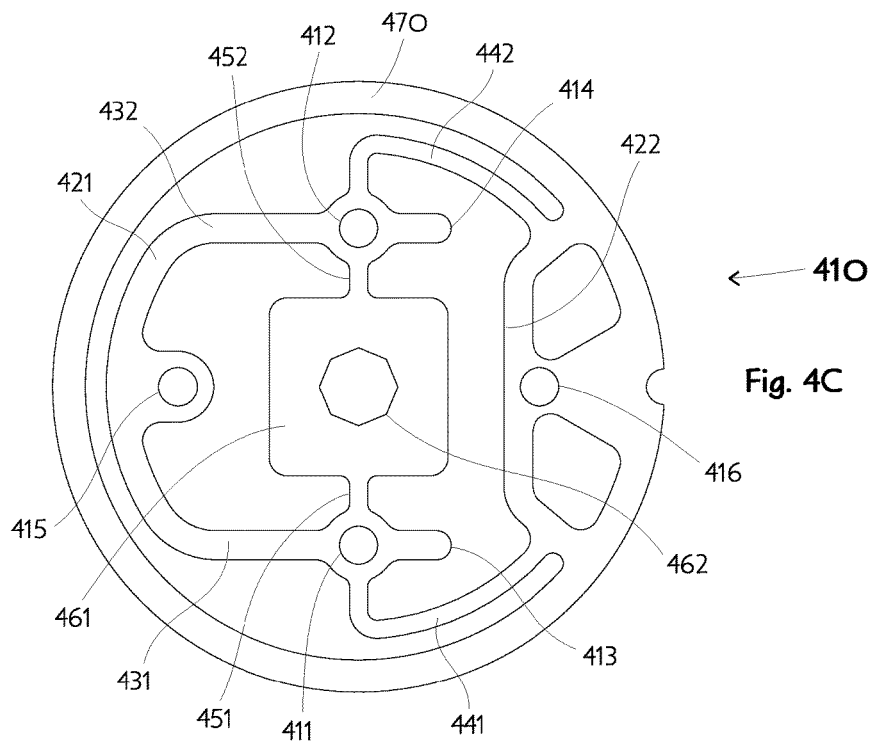
FIG. 4C illustrates a plan view of the amplifier disc of FIG. 4.
Figure 4D:
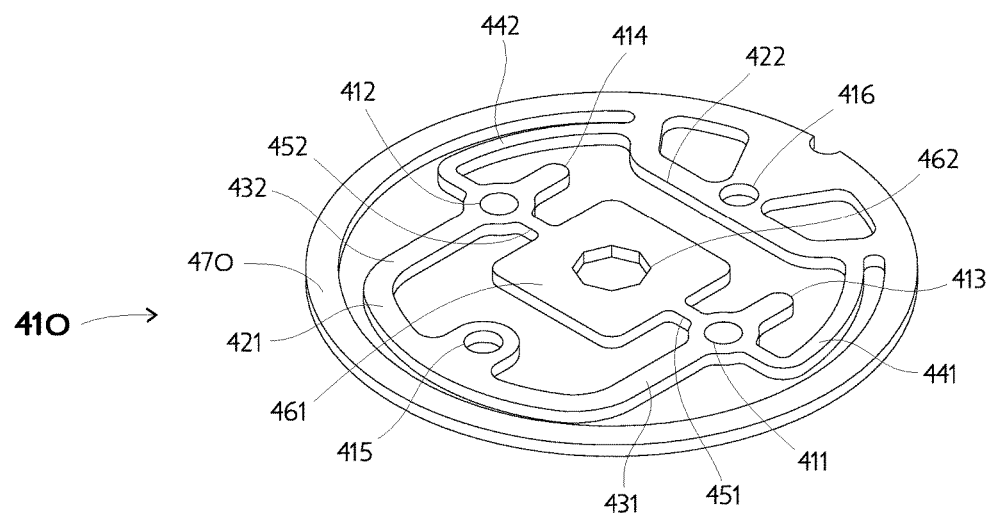
FIG. 4D illustrates another perspective view of the amplifier disc of FIG. 4.

The representative amplifier disc 410 is further illustrated by respective plan and perspective views in FIGS. 4C and 4D. The amplifier disc 410 is made from thin flat springy material that readily returns to form after slight bending and therefore can be metallic or of alternate materials as desired. It is to be appreciated that the amplifier disc 410 may be immersed within a process fluid flowing through a proportional control valve, and therefore material selection should consider the potential for chemical reactions between the fluid and the amplifier disc. Suitable metallic materials for use with semiconductor process fluids can include 300 series stainless steel alloys, chromium alloys, or nickel alloys. The amplifier disc 410 may comprise many individual functional elements that are placed in a bilaterally symmetrical arrangement, and may be an integrated piece of material. Chemical etching, or fine blanking are two possible manufacturing methods for removing material from a piece of sheet metal to form the interconnected functional elements. Other manufacturing methods may include laser cutting, and additive manufacturing processes, such as 3D printing, may alternatively be used. Injection molding may be considered in the case of a VSAM assembly 405 made from a polymer material, such as polypropylene (PP), polyvinylidene fluoride (PVDF), perfluoroalkoxy polymer (PFA), polytetrafluoroethylene (PTFE), polychlorotrifluoroethylene (PCTFE), or polyimide, including polyimide-based polymer materials such as Vespel®. In addition to a peripheral rim 470, there are two diametrically opposite attachment points 411, 412; two balance tabs 413, 414; two tooling holes 415, 416; a swivel lever bar 421; a passive segment 422, two symmetric swivel connecting arms 431, 432; two symmetric passive connecting arms 441, 442; two diametrically opposite torsion bars 451, 452; and a centered active segment 461 having a lifting hole 462. The functional relationship of these elements will be further explained below.

Figure 4E:
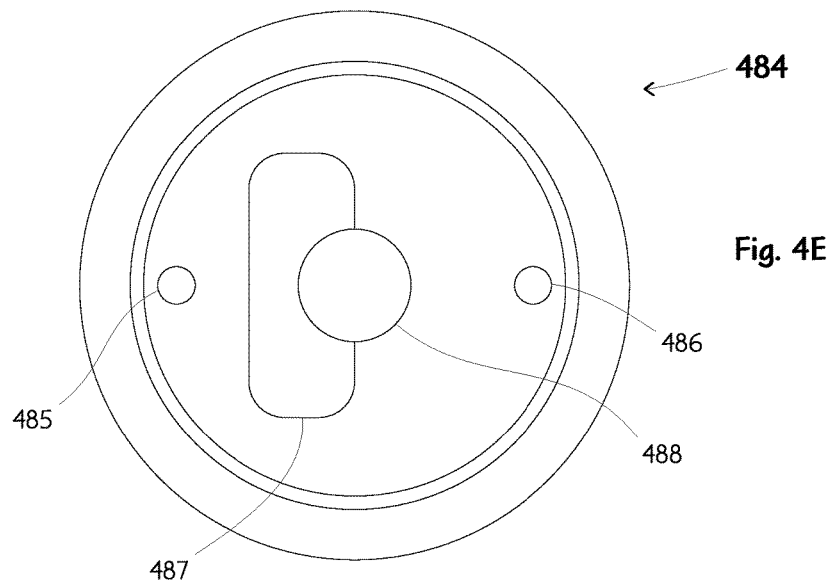
FIG. 4E illustrates a plan view of the control plate of FIG. 4.
Figure 4F:
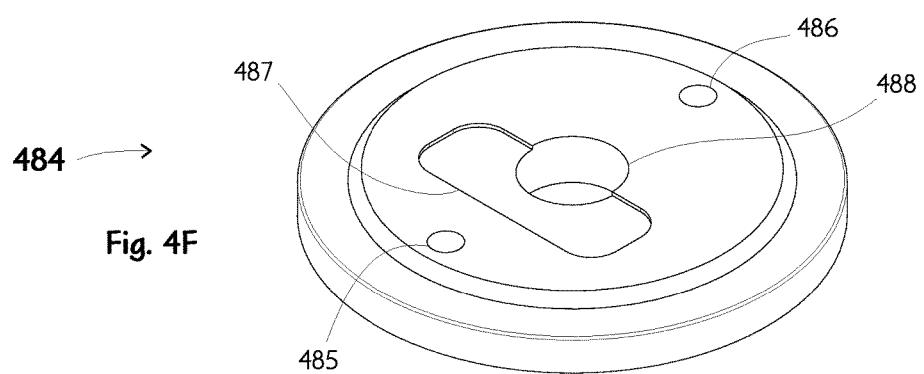
FIG. 4F illustrates another perspective view of the control plate of FIG. 4.

The control plate 484 is further illustrated by respective plan and perspective views in FIGS. 4E and 4F. The control plate 484 is a movable valve member which may modulate and fully stop fluid flow by being brought into sealing contact with an orifice ridge. Consequently, the control plate 484 is also immersed within a process fluid flowing through a proportional control valve and material selection should thus take into consideration the potential for chemical reactions between the process fluid and the control plate. As with the amplifier disc 410, suitable metallic materials for use with semiconductor process fluids can include 300 series stainless steel alloys, chromium alloys, or nickel alloys. The representative control plate 484 may be much thicker than the amplifier disc 410. The control plate 484 may have a planar bottom surface (not shown) to contact an orifice ridge; two blind tooling holes 485, 486; an active segment relief 487; and a central hole 488. The tooling holes 485, 486 of the control plate 484 are used to position the amplifier disc 410 via corresponding tooling holes 415, 416 in the disc. A suitable manufacturing process, such as welding or fasteners, may be used to connect the amplifier disc 410 to the control plate 484 at the two diametrically opposite amplifier disc attachment points 411, 412 when the pairs of tooling holes are aligned (415 & 485 and 416 & 486). The only direct mechanical connection between the amplifier disc 410 and the control plate 484 may be at the two attachment points 411, 412; thus creating the VSAM assembly 405. The peripheral rim 470 (also referred to herein as an outer periphery) of the amplifier disc 410 may conveniently have an outside diameter slightly larger than the outside diameter of the control plate 484 as illustrated in FIG. 4 for ease of holding the peripheral rim 470 in a fixed location.

The amplifier disc 410 is pierced through by a geometrically centered lifting hole 462 that may have at least one straight segment in its perimeter to assist with proper orientation of the VSAM assembly 405. The lifting hole 462 is centered in and surrounded by an active segment 461 (also referred to herein as an inner segment) of the amplifier disc 410. The active segment 461 may rest over the central hole 488 of the control plate 484 and an active segment relief 487 may also be provided in the control plate top surface to allow unfettered motion. A suitable fastener (not shown) may be inserted through the central hole 488 and engage the lifting hole 462 to attach the active segment 461 portion of the VSAM assembly 405 to a movable portion of a valve top-works such as the representative central shaft 396 discussed above in reference to FIG. 3B. Alternatively, other known attachment techniques such as welding or swaging may be used to connect the active segment 461 to a movable portion of a valve top-works. The amplifier disc 410 conveys actuated motion (of a valve top-works moveable portion) to the control plate 484 while defining and controlling the resulting motion of the control plate 484. The amplifier disc 410 thus mediates the motion from the top-works and prevents minor imperfections, such as a slight tilt of the central shaft 396 for example, from changing the intended motion of the control plate 484.

The amplifier disc 410 includes two diametrically opposite torsion bars 451, 452 which extend radially outward from the active segment 461 and terminate at two matching attachment points 411, 412. The torsion bars 451, 452 directly communicate motion of the active segment 461 to the attachment points 411, 412. The diameter line defined by the torsion bars 451, 452 and the attachment points 411, 412 may be descriptively considered as delineating the transition between a "moving half" and a "passive half" of the VSAM assembly 405 ("moving" and "passive" being merely relative terms chosen for ease of explanation). Axial lifting force from a top-works actuator that is applied at the centered lifting hole 462 is communicated to the attachment points 411, 412 by the torsion bars 451, 452. As will be further explained, the "moving" half of the VSAM assembly 405 translates axially even more than the diameter line region, while the "passive" half pivots along a geometric chord. The resulting motion of the VSAM assembly 405 opens a wedge-like gap between the control plate planar bottom surface and the orifice ridge (not shown). When the valve is in a closed condition the various amplifier disc elements are nominally coplanar but when the active segment 461 moves to open the valve, the swivel connecting arms 431, 432 and passive connecting arms 441, 442 become skewed with respect to the peripheral rim 470. Skilled designers will appreciate that a linkage using pins or an axle may be substituted for the torsion bars 451, 452 to accommodate the relative twist between the active segment 461 and the connecting arms 431, 432, 441, 442; however, the clearance necessary for free motion of pins or an axle may introduce lash and hysteresis. The elastic reversible twisting of the torsion bars 451, 452 has no clearance and additionally provides some spring force urging the control plate 484 toward the valve closed condition.

A first pair of connecting arms 431, 432 extend one from each attachment point 411, 412 transversely in mirrored symmetry and terminate at a swivel lever bar 421 located generally midway between the active segment 461 and the peripheral rim 470. A pair of balance tabs 413, 414 project from the attachment points 411, 412 in a direction opposite that of the first pair of connecting arms 431, 432. The swivel lever bar 421 with first connecting arms 431, 432 and balance tabs 413, 414 lessen twisting forces on the attachment points 411, 412 to reduce chances of a peeling failure of the mechanical connection between the amplifier disc 410 and the control plate 484 at the two attachment points 411, 412. A second pair of connecting arms 441, 442 extend one from each attachment point 411, 412 transversely opposite from the first pair of connecting arms 431, 432 are mirrored in symmetry and terminate at a passive segment 422 which has radial connections to the peripheral rim 470. The inward directed edge of the passive segment 422 is generally straight, forming a chord (across the example circular peripheral rim 470) parallel to the diameter line defined by the torsion bars 451, 452 and the attachment points 411, 412. The geometric chord corresponding to the passive segment edge may be located approximately over and parallel to a similar geometric chord imagined between a pair of rest pins 123, 124 or a pair of kidney shape small ends 223, 224 as previously described in the example and valve bodies (190 & 290 respectively) discussed above in reference to FIGS. 1B and 2B.

Holding the peripheral rim 470 in a fixed location and moving the active segment 461 causes the diameter line (defined by the torsion bars & attachment points) to move while the passive segment 422 remains relatively motionless because of its connection to the peripheral rim 470. The second passive connecting arms 441, 442 flex between the passive segment 422 and the attachment points 411, 412 while the swivel lever bar 421 is free to move; thus the control plate 484 is caused to tilt, thereby creating the wedge-like gap as described above. Since the active segment 461 is secured to an element of the top-works via the lifting hole 462, the active segment 461 remains generally parallel to the plane defined by the orifice ridge 120, 220 as it is displaced by the actuator mechanism and the control plate 484 tilts about an axis defined by the torsion bars 451, 452. Thus, when the control plate 484 tilts, the active segment relief 487 allows for clearance of the edges of the active segment 461 that are proximate to swivel connecting arms 431, 432 and swivel lever bar 421. The swivel lever bar 421 also provides restoring force to reliably return the control plate 484 to a parallel position with respect to the plane of an orifice ridge (not shown) when the valve is intended to fully stop fluid flow by moving the control plate into sealing contact with the orifice ridge. The VSAM assembly 405 "passive half" is supported along a geometric chord imagined between the pair of rest pins 123, 124, (refer to FIG. 1B) or the pair of kidney shape small ends 223, 224 (refer to FIG. 2B) as appropriate, whereby the geometric chord is effectively a fulcrum (or swiveling axis) upon which the control plate 484 tilts like a lever. The passive segment 422 urges the control plate 484 against the fulcrum. Action of the amplifier disc elements cause the VSAM assembly 405 "moving half" to lift off (move away from) the orifice ridge, to thereby allow fluid flow, when the top-works moves the active segment 461 away from the orifice ridge. Axial translation at the active segment 461 being centered with respect to the control plate 484 also aids closure of the valve by providing a uniformly distributed force across the control plate 484, thereby urging it to rest against the plane of the orifice ridge and rest pins 123, 124, or the pair of kidney shape small ends 223, 224 as previously described, when it is in the closed position.

Figure 5A:
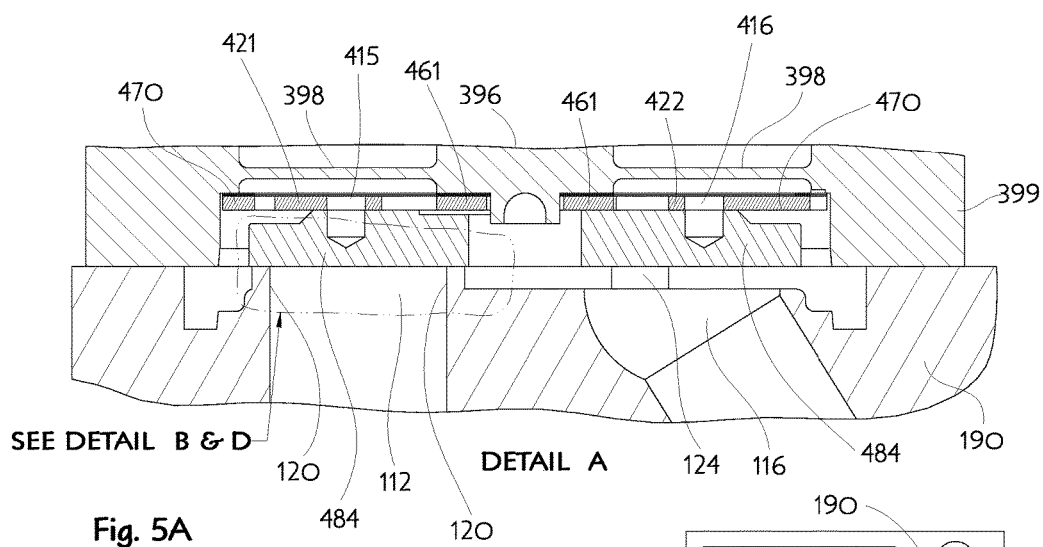
FIG. 5A illustrates an elevation detail section through a representative Valve Stroke Amplification Mechanism assembly and an example metal valve body when the valve is closed.
Figure 5E:
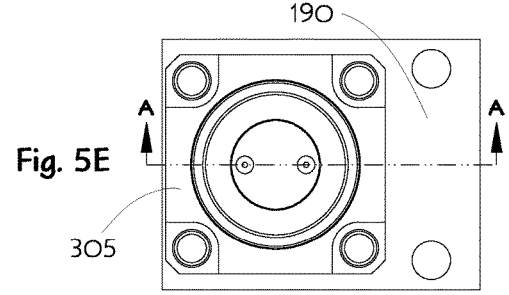
FIG. 5E illustrates a plan view of an example metal valve body with a top-works.
Figure 5B:
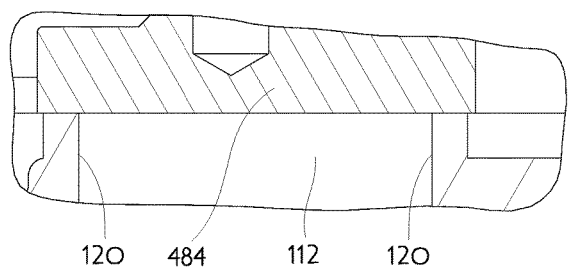
FIG. 5B illustrates an enlarged detail of a section of FIG. 5A though a control plate and a circular orifice ridge when the valve is closed.
Figure 5F:
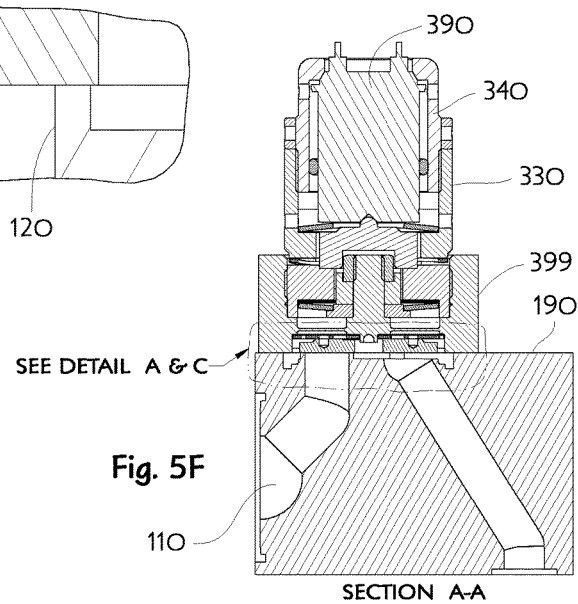
FIG. 5F illustrates an elevation section through an example metal valve body with a top-works that includes a VSAM assembly in accordance with aspects of the invention.
Figure 5C:
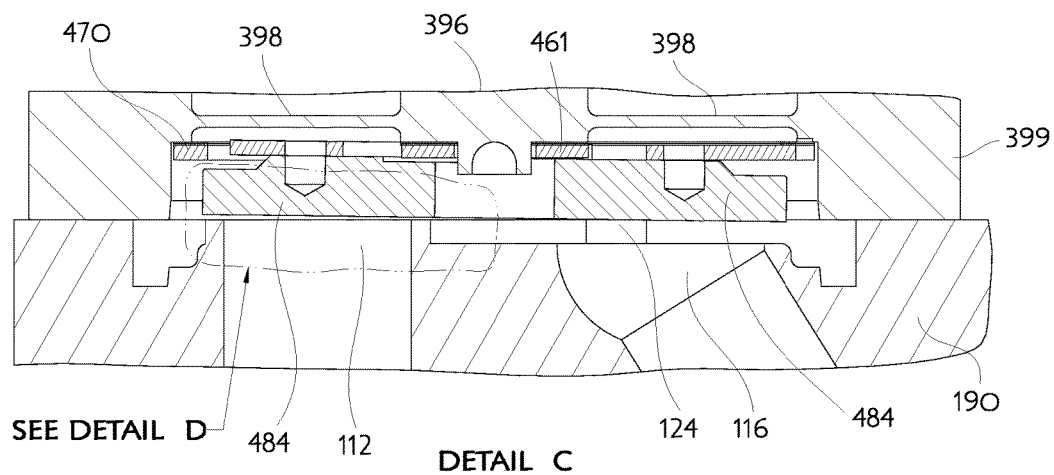
FIG. 5C illustrates an elevation detail section through a representative Valve Stroke Amplification Mechanism assembly and an example metal valve body when the valve is opened.
Figure 5D:
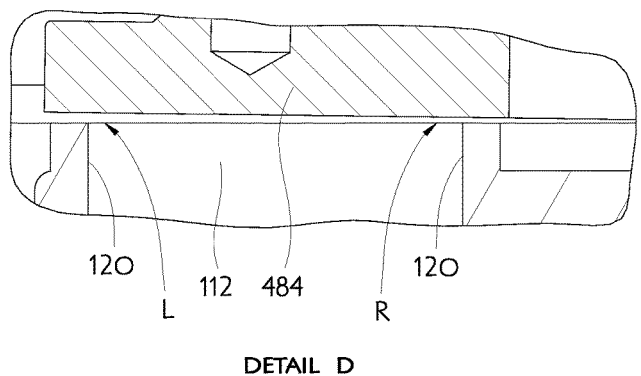
FIG. 5D illustrates an enlarged detail of a section of FIG. 5C though a control plate and a circular orifice ridge when the valve is opened.
Figure 5G:
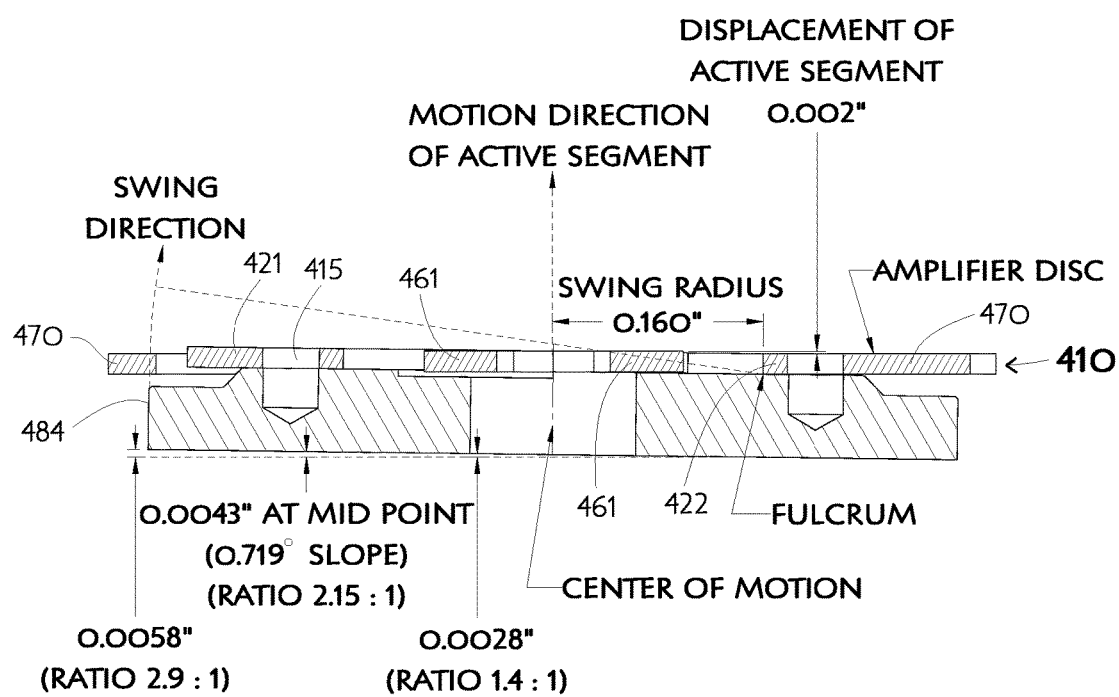
FIG. 5G illustrates an elevation section through a representative Valve Stroke Amplification Mechanism assembly in the valve open condition illustrating movement leverage.

Action of a representative Valve Stroke Amplification Mechanism assembly may be more fully understood by considering the views illustrated in FIGS. 5A-5G. The possibility of combining a top-works, such as top-works 305 shown in FIGS. 3A and 3B, with the example metal valve body 190 of FIG. 1B was described above, and FIG. 5E illustrates a plan view of such a combination. A vertical planar section A-A along the axis of the top-works 305 through the inner fluid conduit aperture 112 and the outer fluid conduit aperture 116 is illustrated in FIG. 5F as indicated. In addition, FIGS. 5A, 5C, and 5G show a cross-section of the VSAM assembly 405 taken along the line marked "D-D" in FIG. 4. Detail A shown in FIG. 5A illustrates how the control plate 484 of the VSAM assembly 405 rests upon the circular orifice ridge 120 (see FIG. 5B) and the visible rest pin 124 when the valve is fully closed to block fluid flow. Detail B shown in FIG. 5B illustrates an enlarged view of this closed condition. The control plate 484 also contacts the other rest pin 123 (not visible in the sectioned views), which taken together define a fulcrum or swiveling axis. The control plate 484 and amplifier disc 410 both extend outward well beyond the active segment so as to fully cover the orifice ridge 120 and rest pins 123, 124 as previously described. Skilled designers will appreciate that the diameter of the circular orifice ridge 120 may be increased until just before reaching the fulcrum (swiveling axis) and the fulcrum is most usually located within the confines of the valve chamber 150.

Energizing or otherwise controlling the actuator 390 will cause upward movement of the central shaft 396 (deflecting the diaphragm 398) which is coupled to the active segment of the amplifier disc 410. The peripheral rim 470 of the amplifier disc 410 remains stationary against the top-works body 399 while movement of the active segment causes the control plate 484 to tilt upward into the top-works body 399 as the control plate 484 is supported by the fulcrum defined by the rest pins 123, 124. It will be appreciated that the intermediary location of the active segment, being between the rest pins and the far side of the orifice ridge, has a leverage effect that moves the extreme edge of the control plate (adjacent the far side of the orifice ridge) more than the active segment moves. Detail C shown in FIG. 5C illustrates the gap formed between the control plate 484 and the circular orifice ridge 120 (see FIG. 5D) while the control plate 484 remains in contact with the visible rest pin 124 corresponding to the fulcrum. Detail D shown in FIG. 5D illustrates an enlarged view of the gap whereby it will be appreciated that the left "L" portion of the gap is appreciably larger than the right "R" portion of the gap; hence the wedge-like gap as described above. The leverage effect of the representative Valve Stroke Amplification Mechanism (VSAM) assembly, comprised of the amplifier disc 410 and control plate 484, is illustrated in FIG. 5G as an elevation cross-section with relevant dimensions annotated in inches. Given a nominal distance of 0.1600 inches from the fulcrum defined by the rest pins 123, 124 to the active segment, and a nominal distance of 0.304 inches from the active segment to the extreme edge of the control plate 484, a lift ratio of 2.9×([0.304+0.160]/0.160=2.9) can be achieved; thus, an active segment movement of only 0.0020 inches will cause a 0.0058 inch movement of the extreme edge of the control plate 484.

An appreciation of the increased valve conductance provided by using the Valve Stroke Amplification Mechanism (VSAM) assembly may be obtained by comparing the estimated flow achievable with a specific uniaxial translation of a control plate over a distance "s" (corresponding to any particular actuator stroke "S") versus the estimated flow achievable with that same translation "s" applied to the VSAM assembly and the resultant tilting (swivel) of a control plate with respect to an identical orifice ridge. Examining Equations (3) and (4), it is apparent that for a specific set of conditions (orifice ridge geometry r1 & r2, gas species, temperature, pressure differential, etc.) the flow through the valve characterized as Radial Viscous Flow Between Two Parallel Annular Plates may also be expressed as $$Q_c\{s\} = \text{INTEGRAL}\{X*s^3*d\_theta\}[0-2pi] \quad \text{Equation (9);}$$

where subscript "c" refers to a constant gap height around the circumference,

INTEGRAL{ }[ ] intends to integrate the expression { } over the range [0–2 pi] of the circumferential derivative d_theta around the entire perimeter consisting of 2-pi radians, X is a nominal constant accounting for all variables (r1, r2, gas species, inlet and outlet pressures, temperature, etc.) except the constant gap height, and s is the gap height corresponding to a particular actuator stroke S.

Thus $Qc\{s\} = X*2*pi*s^3$.

In the case of the Valve Stroke Amplification Mechanism (VSAM) assembly, the gap height "h" will vary with circumferential position, and in some locations will be radially dependent as well (i.e. not uniform across the radial extent from the orifice ridge inner radius "r1" to the orifice ridge outer radius "r2"). In the illustrated representative apparatus, the orifice ridge 120 is offset radially (as seen positioned toward the left in FIGS. 5A and 5B) from the central shaft 396 which is moved by effort of the actuator 390. In this instance, the gap between the orifice ridge 120 (jet) and the adjacent planar control plate 484 (seat) will consist of a uniform height gap portion "s" and a wedge-like additional portion "h_theta" that varies along the circumference of the orifice ridge 120. The wedge-like "h_theta" will be zero at the rightmost edge of the orifice ridge 120 and reach a maximum at the leftmost edge of the orifice ridge 120 according to a function of the form h_theta*(1+sin {theta})/2. The exact value of the uniform gap height portion "s" will depend upon whether the edge of the orifice ridge 120 is located away from the fulcrum and beyond the active segment, is nominally matched to the location of the active segment, or whether it extends closer to the fulcrum. For the present comparative analysis it is convenient (and not limiting) to assume an average radius of the orifice ridge that falls exactly under the centerline of the active segment. In this configuration, the uniform gap portion "s" will be exactly equal to the opening that the movable portion of the valve top-works 305 would have created by a typical uniaxial translation of the control plate 484. Although the gap between the control plate and the orifice ridge will vary with radius in most circumferential locations, a reasonable approximation of the flow through that gap may be made by assuming a radially constant gap height occurring at each location along the circumference at the average radius ((r1+r2)/2). Using the simplification shorthand of Equation (9), the approximate conductance is $$Qw\{s+h\_theta\} = \text{INTEGRAL}\{X*(s+h\_theta*(1+\sin\{theta\})/2)^3*d\_theta\}[0-2pi] \quad \text{Equation (10);}$$

where subscript "w" refers to the wedge-like gap around the circumference,

INTEGRAL{ }[ ] intends to integrate the expression { } over the range [0–2 pi] of the circumferential derivative d_theta around the entire perimeter consisting of 2-pi radians, sin { } is the plane geometry sine function, X is a nominal constant accounting for all variables (r1, r2, gas species, inlet and outlet pressures, temperature, etc.) except the variable gap height, s is the uniform portion of the gap height corresponding to a particular actuator stroke S and in this instance equals the amplifier disc active segment motion, and
h_theta=orifice ridge dia.*tan {phi}=max. of the wedge-like portion of the gap height,
wherein phi=arctan {s/[fulcrum to active segment distance]}=control plate tilt angle.
Thus Qw{s+h_theta}=

$$X*pi*(s+h\_theta/2)*(2*s^2+2*s*h\_theta+(5/4)*h\_theta^2) \quad \text{Equation (11)}.$$

Evaluating and forming a ratio between Equations (9) and (11) suggests in the case of the example metal valve illustrated in FIGS. 5A-5G an effective conductance increase by about a factor of six (6×) that may be expected compared to that achieved with a typical constant gap height arrangement piezoelectric actuator, as shown below in Table 2:

TABLE 2

Calculated Approximate Conductance Gain for Representative VSAM assembly

| | | | | | | | |
|---|---|---|---|---|---|---|---|
| center lift "s" [inch] | 0.00200 | 0.00160 | 0.00120 | 0.00080 | 0.00060 | 0.00040 | 0.00020 |
| swing radius "R" [inch] | 0.160 | 0.160 | 0.160 | 0.160 | 0.160 | 0.160 | 0.160 |
| tilt angle "phi" [degrees] | 0.716 | 0.573 | 0.430 | 0.286 | 0.215 | 0.143 | 0.072 |
| ave. orifice ridge dia. [inch] | 0.215 | 0.215 | 0.215 | 0.215 | 0.215 | 0.215 | 0.215 |
| max. extra gap "h_theta" | 0.00269 | 0.00215 | 0.00161 | 0.00108 | 0.00081 | 0.00054 | 0.00027 |
| wedge-like Qw{s + h_theta} | 2.92E−07 | 1.49E−07 | 6.30E−08 | 1.87E−08 | 7.88E−09 | 2.33E−09 | 2.92E−10 |
| constant gap Qc{s} | 5.03E−08 | 2.57E−08 | 1.09E−08 | 3.22E−09 | 1.36E−09 | 4.02E−10 | 5.03E−11 |
| conductance ratio | 5.81 | 5.81 | 5.81 | 5.81 | 5.81 | 5.81 | 5.81 |

In the case of the high-conductance valve illustrated in FIG. 2B, an even larger effective conductance increase may be expected because a large portion of the non-circular (e.g. kidney-shaped) orifice ridge is proximate to the "moving" half of the control plate and the correspondingly thicker portion of the wedge-like gap. It should be appreciated that other configurations of valve bodies (besides the examples given in FIGS. 1B and 2B) may be used in combination with the VSAM assembly disclosed herein, including those with multiple ports (i.e., two or more inputs and/or two or more outputs, etc.). It will also be appreciated by practitioners that the above described valve stroke amplification mechanisms are circularly axisymmetric as a matter of convenience and usual manufacturing practice, but practitioners should note nothing prevents the designs disclosed herein from being used within any rectilinear structure, or using rectilinear elements, such as a rectangular or square control plate, for example.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A valve stroke amplification mechanism assembly, comprising:

an amplifier disc constructed from a flat springy material and having an inner segment and an outer periphery, the inner segment centered within the outer periphery and mechanically coupled to and spaced apart from the outer periphery by a pair of passive connecting arms,
a first passive connecting arm of the pair of passive connecting arms extending from a first attachment point and a second passive connecting arm of the pair of passive connecting arms extending from a second attachment point, the pair of passive connecting arms connected together by a passive segment having at least one radial connection extending to the outer periphery that mechanically couples the inner segment to the outer periphery, the passive segment positioned off-center within the outer periphery, and
a first swivel connecting arm of a pair of swivel connecting arms extending from the first attachment point and a second swivel connecting arm of the pair of swivel connecting arms extending from the second attachment point, the pair of swivel connecting arms connected together by a swivel lever bar such that axial displacement of the inner segment causes asymmetric axial displacement between the passive segment and the swivel lever bar; and
a control plate mechanically coupled to the amplifier disc at the first and the second attachment points.

2. The valve stroke amplification mechanism assembly of claim 1, wherein the amplifier disc is configured to flex and the inner segment is coupled to an actuated valve element, and wherein the control plate has a planar surface configured to contact an orifice ridge surrounding a fluid conduit aperture such that the asymmetric displacement causes the planar surface of the control plate to tilt at an angle with respect to a plane of the orifice ridge.

3. The valve stroke amplification mechanism assembly of claim 2, wherein the amplifier disc and the control plate are disposed within a valve chamber and immersed in fluid that flows through the valve chamber, and the control plate is attached to a deflectable portion of the actuated valve element by the amplifier disc.

4. The valve stroke amplification mechanism assembly of claim 3, wherein the control plate is configured to block fluid flow through the valve chamber when the planar surface is positioned parallel to the plane of the orifice ridge.

5. The valve stroke amplification mechanism assembly of claim 2, wherein the amplifier disc and the control plate are disposed within a top-works attached to a valve body comprising the orifice ridge and the fluid conduit aperture.

6. The valve stroke amplification mechanism assembly of claim 5, wherein the orifice ridge is circular and off-center within the valve body.

7. The valve stroke amplification mechanism assembly of claim 2, wherein the planar surface of the control plate includes a recess configured to allow for clearance of edges of the inner segment when the planar surface of the control plate tilts.

8. The valve stroke amplification mechanism assembly of claim 1, wherein at least one of the amplifier disc and the control plate comprise metallic materials.

9. The valve stroke amplification mechanism assembly of claim 8, wherein the metallic materials are at least one of 300 series stainless steel alloys, chromium alloys, and nickel alloys.

10. The valve stroke amplification mechanism assembly of claim 1, wherein at least one of the amplifier disc and the control plate comprise polymer materials.

11. The valve stroke amplification mechanism assembly of claim 10, wherein the polymer materials are at least one of polypropylene, polyvinylidene fluoride, perfluoroalkoxy polymer, polytetrafluoroethylene, polychlorotrifluoroethylene, and polyimide.

12. The valve stroke amplification mechanism assembly of claim 1, wherein each pair of the passive connecting arms and the swivel connecting arms are positioned in a bilaterally symmetrical physical arrangement.

13. The valve stroke amplification mechanism assembly of claim 1, wherein the amplifier disc further comprises a plurality of functional elements positioned in a bilaterally symmetrical physical arrangement.

14. The valve stroke amplification mechanism assembly of claim 13, wherein the plurality of functional elements includes at least one of balance tabs, tooling holes, and torsion bars.

15. The valve stroke amplification mechanism assembly of claim 14, wherein the balance tabs include a first balance tab projecting from the first attachment point and a second balance tab projecting from the second attachment point, the first and the second balance tabs projecting in a direction opposite that of the pair of swivel connecting arms.

16. The valve stroke amplification mechanism assembly of claim 15, wherein the torsion bars include a first torsion bar extending radially from the inner segment and terminating at the first attachment point and a second torsion bar extending radially from the inner segment and terminating at the second attachment point.

17. The stroke amplification mechanism assembly of claim 16, wherein the first and the second attachment points and the first and the second torsion bars define a diameter line of the amplifier disc and the passive segment is spaced apart from the diameter line.

18. The valve stroke amplification mechanism assembly of claim 1, wherein an outer diameter of the amplifier disc is slightly larger than an outer diameter of the control plate.

19. The valve stroke amplification mechanism assembly of claim 1, wherein the first and the second attachment points are positioned in a bilaterally symmetrical physical arrangement.

20. The valve stroke amplification mechanism assembly of claim 1, wherein the at least one radial connection includes a pair of asymmetrically positioned radial connections.

* * * * *